United States Patent [19]
Mizoguchi

[11] 3,782,849
[45] Jan. 1, 1974

[54] BORING HEAD

[76] Inventor: Sutemaru Mizoguchi, No. 1738, Kita-tawara-cho, Ikoma City, Japan

[22] Filed: Mar. 30, 1972

[21] Appl. No.: 239,647

Related U.S. Application Data

[62] Division of Ser. No. 93,932, Dec. 1, 1970, Pat. No. 3,730,636.

[52] U.S. Cl. .................. 408/197, 408/146, 408/239
[51] Int. Cl. ....... B23q 3/12, B23b 29/02, B23b 3/24
[58] Field of Search .................... 408/153, 182, 185, 408/186, 197, 227, 233, 238, 232, 239, 153; 29/105 A; 279/6

[56] References Cited
UNITED STATES PATENTS
3,363,486   1/1968   Tourison ......................... 408/232 X

FOREIGN PATENTS OR APPLICATIONS
82,251   12/1934   Sweden ............................. 408/239

*Primary Examiner*—Francis S. Husar
*Attorney*—E. F. Wenderoth et al.

[57] ABSTRACT

A boring head with bit adjusting means. The head has a body having a shank portion and a transverse channel in the lower part thereof and a transverse hole therein intersecting the channel and at right angles thereto. A pair of bit mounting bases is slidably positioned in the channel and a transverse hole extends through the bases generally aligned with the transverse hole in said body. A bolt is rotatably mounted in one end of the transverse hole in the body, extending through the transverse hole in the bases and threaded into the other end of the transverse hole in the body, the hole in the bases is larger than the bolt for permitting some relative movement between the bases and the bolt. A bit is secured to each of the bases, one being at one end of one base and the other being at the other end of the other base. Wedge means is provided for adjusting the positions of the bases downwardly in the channel when the bolt is only gently tightened.

1 Claim, 6 Drawing Figures

BORING HEAD

This application is a division of application Ser. No. 93,932 and now U.S. Pat. No. 3,730,636.

This invention relates to a boring head for use in internal cutting, and more particularly to a boring head having a bit which is easily extendable and retractable.

In the conventional boring head the bit is adjustably secured directly to the boring head by means of a screw, making it necessary when adjusting the position of the bit to loosen the screw each time the bit is to be extended or retracted. Thus, the known boring head has a disadvantage in that it requires a great deal of effort to adjust the bit thereof.

The first object of this invention is to obviate the aforementioned constructional defect of the conventional boring head, and to provide a boring head which is simple in construction and easy to operate.

The second object of this invention is to facilitate the adjusting operation of the bit and also facilitate the determination of the fixed bit position by improving the fixing means for fixing the bit to the boring head.

The third object of this invention is to facilitate minute adjustment of the bit by means of micromotion of bit mounting tables fixed to the boring head.

Those objects mentioned hereinbefore are attainable by the improvement, combination and operation of each segment constituting this invention, and the preferred embodiments thereof will be illustrated in the detailed description set forth hereinunder with reference to the accompanying drawings.

Amendments and modifications with regard to details of the construction are to be included in the claims appearing hereinafter.

Figure 1:
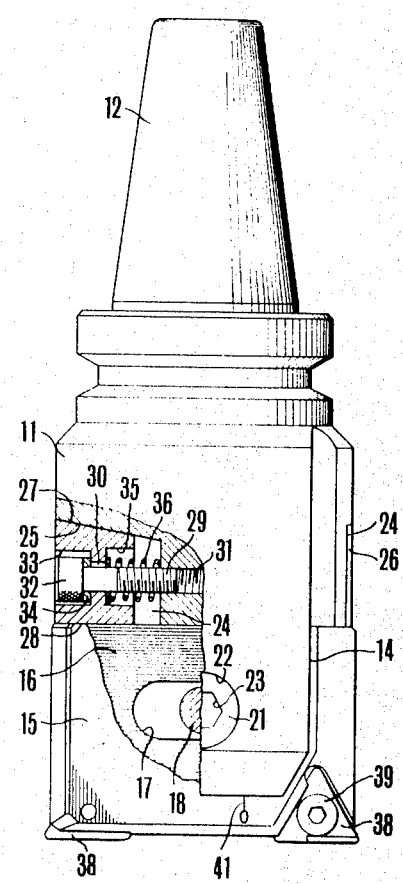
FIG. 1 is an elevation partially in longitudinal section, showing a first embodiment of the boring head according to this invention.
Figure 2:
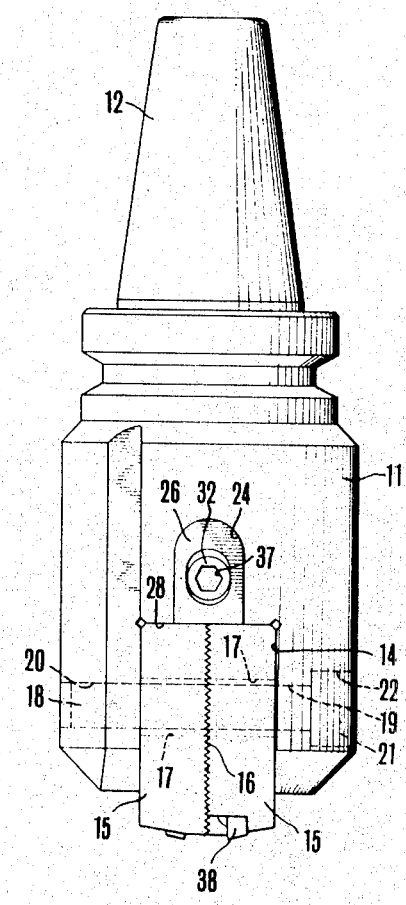
FIG. 2 is a lateral view of the foregoing embodiment.
Figure 3:
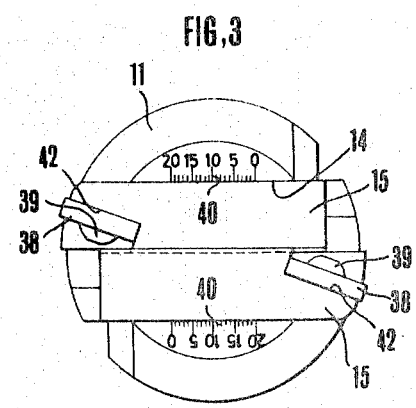
FIG. 3 is a bottom view of the foregoing embodiment.

In the embodiment shown in FIGS. 1 to 3, the numeral 11 designates a boring head body having a shank 12 with a tapering, straight or any other arbitrary shape. In the lower part of the boring head body 11 is formed a concave channel 14 traversing said body 11, the center of said concave channel 14 coinciding with that of the axis of the body 11, both ends of said concave channel 14 being open on the peripheral surface of the body 11.

A pair of bit mounting bases 15 are slidably fitted inside the concave channel 14. On the confronting faces of these mounting bases 15 are formed traverse zigzag ridges 16 slidably engaging with each other, said two mounting bases 15 with the zigzag ridges 16 engaging with each other being fitted into the concave channel 14 so as to be smoothly slidable between both lateral sides of said channel 14.

In each of the mounting bases 15 is formed a traverse hole, a fixing bolt 18 attached to the body 11 being loosely fitted in said traverse hole 17. This bolt 18 is loosely fitted in a hole 19 which is so formed on both sides of the concave channel 14 of the head 11 that it intersects at right angles with said concave channel 14, and is screwed into a threaded portion 20 of hole 19 on one side of channel 14. The head 21 of the bolt 18 is fitted into a large-calibered bore 22 on the outside end of the hole 19. On the outside of said head 21 is formed a polygonal bore 23 for engagement by a revolving tool.

The numeral 24 designates a pair of diametrically opposed concavities formed in the upper part of both ends of the concave channel 14, the lower parts of the concavities 24 communicating with the concave channel 14, the upper faces 25 of said concavities 24 being inclined downwardly towards the back thereof, as shown in FIG. 1.

The numeral 26 designates a wedge member fitted into each of the concavities 24, the upper edge 27 of said wedge member 26 being inclined so that it fits against the upper face 25 of each concavity 24, the underside 28 thereof being horizontal so as to fit against the upper face of each bit mounting base 15. Moreover said underside 28 is positioned so that part of it will extend over the upper face of each mounting base 15, as shown in FIG. 2.

The numeral 29 designates a bolt which is loosely fitted into a hole 30 provided in each wedge member 26, said bolt 29 being screwed into a threaded hole 31 provided at the back of the concavity 24, the head 32 of each bolt 29 being loosely fitted inside a large-calibered bore 33 formed on the outside end of the bore 30. The parts are so arranged that said head 32 will be pressed against the bottom of the large-calibered bore 33 through a washer 34. A coil spring 36 is fitted between a large-calibered bore 35 formed on the inside and of the hole 30 and the back of the concavity 24, said coil spring 36 being externally fitted around the bolt 29, the outer end of the spring 36 being pressed against the bottom of the large-calibered bore 35 through a washer 36. Furthermore, in the aforementioned head 32 is formed a polygonal concavity 37 for engagement with a revolving tool as shown in FIG. 2. The numeral 38 designates a bit secured by a bolt 39 in a concavity 42 at the opposite ends of the mounting bases 15.

The numeral 40 designates scales provided on the underside of the body 11, said scales 40 being formed along both sides of the concave channel 14 to show the position of an indicator 41 provided on the lateral side of each bit mounting base 15.

In the first embodiment of this invention, each bit mounting base 15 is freely slidable inside the concave channel 14 when the bolt 18 is loosened, and the amount each bit 38 extends beyond the lateral side of the body 11 is freely adjustable by sliding traversely each mounting base 15 along the zigzag ridges 14 inside the concave channel 14, the position of each bit 38 being accurately determinable by setting the indicator on the mounting base 15 on the scale 40.

If the wedge member 26 is moved toward the back of the concavity 24 by screwing each bolt 29 inwardly, when the bit mounting bases 15 have been stabilized by gently tightening the bolt 18, the upper faces of the mounting bases are contacted by the undersides 28 of the wedge members 26 and the inclined upper edge 27 of the wedge member 26 slides obliquely downwardly along the inclined upper face 25 of the concavity 24, as a result of which the lower part of each wedge member 26 gradually presses each mounting base 15 downwardly, thereby making possible minute adjustment of the amount of the downward extensions of the bit 38.

Both bit mounting bases 15 are tightly engaged at both sides of the concave channel 14 when the bolt 18 is tightened after adjustment of the position of said bases 15 as described hereinbefore. In this state, the boring head body 11 is attached to the main shaft of a taper shank boring machine for the boring operation.

Figure 4:
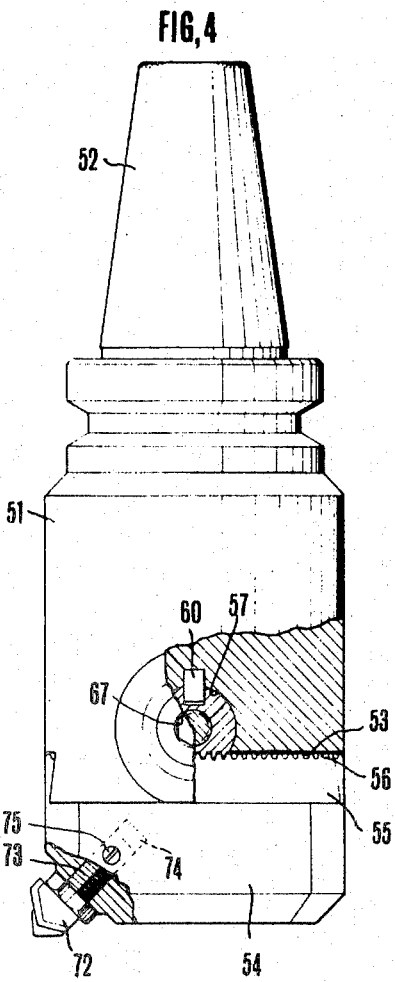
FIG. 4 is an elevation partially in longitudinal section, showing a second embodiment of this invention.
Figure 5:
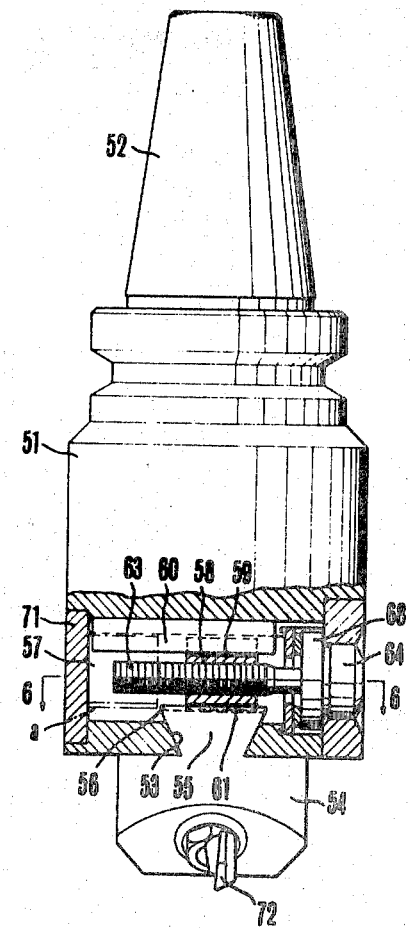
FIG. 5 is a lateral view partially in longitudinal section of the foregoing embodiment.
Figure 6:
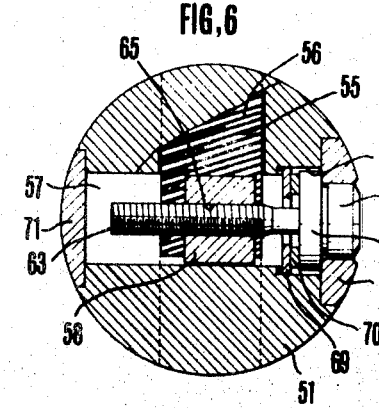
FIG. 6 is a cross sectional view taken on the line 6—6 in FIG. 5.

FIGS. 4 to 6 show that the transverse minute adjustment of the bit is easily carried out in the second embodiment of this invention.

In FIGS. 4 to 6, the numeral 51 designates a boring head body having thereon shank 52 with a tapering, straight, or any other arbitrary shape, a dovetail channel 53 being traversely formed in the lower part of the body 51. The numeral 54 designates a bit mounting base having a dovetail protrusion 55 integrally formed on the upper part thereof which is slidably fitted into the aforementioned dovetail channel 53, a helical rack gear 56 being formed on said protrusion 55.

In the body 51 is formed a transverse hole 57 positioned above the dovetail channel 53 and crossing said channel at right angles thereto, the central lower part of the transverse hole 57 communicating with the central part of the dovetail channel 53. Inside the transverse hole 57 is slidably fitted a sliding element 58, a key 60 axially provided on the upper side of the transverse hole 57 being slidably fitted into a key groove 59 on the upper side of the sliding element 58, so that said sliding element 58 can accurately move along the axis of of the transverse hole 57. Furthermore, on the underside of the sliding element 58 is formed a helical rack gear 61 in mesh with the helical rack gear 56.

The head 64 of a bolt 63 is rotatably fitted into an annular member 62 secured over one end of the transverse hole 57, a polygonal concavity 67 for engagement with a revolving tool being formed on the outside of said head 64. The bolt 63 is concentric with the transverse hole 57 and is screwed into a threaded hole 65 formed in the sliding element 58. A large-calibered bore 66 is formed in the transverse hole at the end over which the annular member 62 is secured, and a flange 68 concentrically formed at the base of the head 64 of the bolt 63 being supported on the inner end of the large-calibered bore 66 through washers 69 and 70. The other end of the transverse hole 57 is closed by a lid 71 thereover.

The numeral 72 designates a bit fixed to the external end of a bolt 73, said bolt 73 being screwed into a threaded hole 74 formed obliquely in the lower part of one end of the bit mounting base 54 and secured in position with a setscrew 75.

In the second embodiment, as indicated in the drawings, if the bolt 63 is revolved by engaging a revolving tool in the concavity 67 of the bolt 63 with the helical rack gear 56 and the helical rack gear 61 of the sliding element 58 meshing with each other, then the sliding element 58 moves in the axial direction, being prevented from revolving. As a result, the mounting base 54 having the protrusion 55 which engages with the sliding element 58 moves along the dovetail channel 53, thereby altering the amount of lateral extension of the bit 72. Since the transversal movement of the mounting base 54 is extremely small as compared with the amount of rotation of the bolt 63, the amount the bit 72 extends can be very finely adjusted. If the bolt 63 is revolved in the same direction continuously, the sliding element 58 is ultimately brought into contact with the lid 71 as shown by the broken line (a) in FIG. 5, the helical rack gear of the sliding element 58 being completely disengaged from the helical rack gear 56 on the protrusion 55.

In this condition, the bit mounting base 54 becomes slidable independently of the bolt 63, thereby making it possible to move the mounting base 54 a large distance.

After the position of the bit 72 has been changed to a large extent by disengaging the helical rack gear 61 from the helical rack gear 56 as described hereinbefore, minute adjustment can again be carried out by revolving the bolt 63, thereby moving the sliding element 58 toward the protrusion 55 so that the rack gears 61 and 56 can mesh with each other. Therefore, in this embodiment, both minute adjustment and large-scale movement of the position of the bit are possible.

I claim:

1. A boring head comprising a body having a shank portion and a transverse channel in the lower part thereof and a transverse hole therein intersecting the channel and at right angles thereto, a pair of bit mounting bases slidably positioned in said channel and having interengaging longitudinally extending ridges and grooves on the opposed engaging lateral faces of said bases, a transverse hole through said bases generally aligned with said transverse hole in said body, a bolt rotatably mounted in one end of said transverse hole in said body, extending through the transverse hole in said bases and threaded into the other end of said transverse hole in said body, said hole in said bases being larger than said bolt for permitting some relative movement between said bases and said bolt, and a bit secured to each of the bases, one being at one end of one base and the other being at the other end of the other base.

* * * * *